United States Patent
Liu et al.

(10) Patent No.: US 12,210,505 B2
(45) Date of Patent: Jan. 28, 2025

(54) OPERATION REQUEST PROCESSING METHOD, APPARATUS, DEVICE, READABLE STORAGE MEDIUM, AND SYSTEM

(71) Applicant: ALIBABA CLOUD COMPUTING CO., LTD., Hangzhou (CN)

(72) Inventors: Dongming Liu, Zhejiang (CN); Feifei Li, Zhejiang (CN); Xiaojian Fan, Zhejiang (CN); Songlu Cai, Zhejiang (CN); Guangzhou Zhang, Zhejiang (CN); Zhongxing Zhang, Zhejiang (CN)

(73) Assignee: Alibaba Cloud Computing Co., Ltd., Hangzhou (CN)

( * ) Notice: Subject to any disclaimer, the term of this patent is extended or adjusted under 35 U.S.C. 154(b) by 0 days.

(21) Appl. No.: 18/043,891

(22) PCT Filed: Aug. 11, 2021

(86) PCT No.: PCT/CN2021/112057
§ 371 (c)(1),
(2) Date: Mar. 2, 2023

(87) PCT Pub. No.: WO2022/048416
PCT Pub. Date: Mar. 10, 2022

(65) Prior Publication Data
US 2023/0315713 A1    Oct. 5, 2023

(30) Foreign Application Priority Data
Sep. 4, 2020 (CN) .......................... 202010923660.2

(51) Int. Cl.
*G06F 16/23* (2019.01)
*G06F 16/22* (2019.01)

(52) U.S. Cl.
CPC ...... *G06F 16/2343* (2019.01); *G06F 16/2282* (2019.01)

(58) Field of Classification Search
CPC .......................... G06F 16/2343; G06F 16/2282
(Continued)

(56) References Cited

U.S. PATENT DOCUMENTS 4,853,843 A * 8/1989 Ecklund ............. G06F 16/2379
707/999.203
8,869,174 B2 10/2014 Wong
(Continued)

FOREIGN PATENT DOCUMENTS

CN     102043838 A    5/2011
CN     105426469 A    3/2016
(Continued)

OTHER PUBLICATIONS

International Search Repot of PCT/CN2021/112057, Nov. 22, 2021, 4 pages.
(Continued)

*Primary Examiner* — Hung T Vy
(74) *Attorney, Agent, or Firm* — Clark Hill PLC

(57) ABSTRACT

Embodiments in the present description provide an operation request processing method and apparatus, and a device, and a readable storage medium, and a system. In the present embodiment, after obtaining an operation request for a data table, a read-write node can return a request processing completion message to a requester in time without waiting for all read-only nodes; a locking operation is performed on the data table, a log of locking the data table is written into a redo log file; and after status information of the log of locking is written into a status record, a monitoring processing process can achieve log playback monitoring of all the read-only nodes by using the status record and the log of
(Continued)

locking. Thus, an asynchronous processing mechanism is achieved, and the stability and efficiency of operation request execution are improved.

18 Claims, 3 Drawing Sheets

(58) Field of Classification Search
USPC .......................................................... 707/704
See application file for complete search history.

(56) References Cited

U.S. PATENT DOCUMENTS

2005/0216462 A1* 9/2005 Xiao ................... G06F 16/2458
2006/0101081 A1* 5/2006 Lin ...................... G06F 16/2343

FOREIGN PATENT DOCUMENTS

| CN | 111324665 A | 6/2020 |
| CN | 111930788 A | 11/2020 |

OTHER PUBLICATIONS

Written Opinion of International Searching Authority for PCT/CN2021/112057, Nov. 22, 2021, 4 pages.

English Translation of Written Opinion, dated Nov. 22, 2021 for International Application No. PCT/CN2021/112057, 5 pages.

* cited by examiner

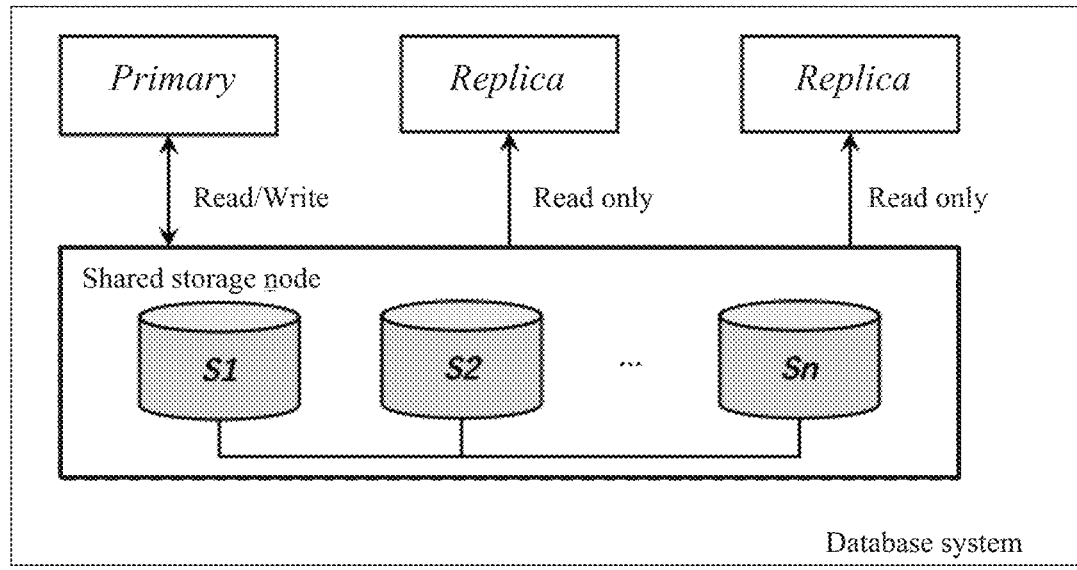

FIG. 1

202 performing a locking operation, for an operation request to a data table initiated by a requester, to the data table, and writing a log of locking the data table into a redo log file, and after writing status information of the log of locking into a status record, returning a request processing completion message to the requester

204 after monitoring, by a monitoring processing process based on the status information of the log of locking in the status record, that all read-only nodes have played back to the log of locking, performing a corresponding operation on the data table based on the operation request

FIG. 2A

OPERATION REQUEST PROCESSING METHOD, APPARATUS, DEVICE, READABLE STORAGE MEDIUM, AND SYSTEM

The present application is a U.S. national phase patent application of PCT/CN2021/112057, filed Aug. 11, 2021, which claims priority to Chinese Patent Application No. 202010923660.2, filed with the Chinese Patent Office on Sep. 4, 2020 and entitled "OPERATION REQUEST PROCESSING METHOD, APPARATUS, DEVICE, READABLE STORAGE MEDIUM, AND SYSTEM", each of the aforesaid applications being incorporated herein by reference in its entirety.

TECHNICAL FIELD

The present description relates to database technology field, and in particular to an operation request processing method, an apparatus, a device, a readable storage medium, and a system.

BACKGROUND

With the development of cloud computing and big data, the scale of user data has been increasing, and business scenarios are becoming more and more complex. Traditional cloud databases will encounter many problems due to their own architecture. For example, each of a read-write compute node and a read-only compute node has independent data, and the costs of storage and computing are relatively high; the backup time is relatively long when the amount of data is large; building read-only instances is relatively slow; the space is limited by the size of physical disk, etc. For the expansion of user business and faster fault recovery, an architecture of separating computing from storage has been born on demand, and the architecture conforms to the elasticity and scalability characteristics of cloud computing. In order to realize the separation of storage and computing, the same storage data needs to be shared among compute nodes. Under the architecture of shared storage, when performing data operations, the read-write compute node needs to refer to the behavior of the read-only compute node. Based on this, a more efficient processing solution needs to be provided.

SUMMARY

In order to overcome the problems in the relevant art, the present description provides an operation request processing method, an apparatus, a device, a readable storage medium, and a system.

According to a first aspect of the embodiments of the present description, an operation request processing method is provided, wherein the method is applied to a read-write node in a shared storage service cluster, and the service cluster includes at least one read-write node and at least one read-only node; wherein the method includes: performing a locking operation, for an operation request to a data table initiated by a requester; to the data table, and writing a log of locking the data table into a redo log file, and after writing status information of the log of locking into a status record, returning a request processing completion message to the requester; and after monitoring, by a monitoring processing process based on the status information of the log of locking in the status record, that all read-only nodes have played back to the log of locking, performing a corresponding operation on the data table based on the operation request.

Optionally, the monitoring processing process monitors, according to a set period, whether all the read-only nodes have played back to the log of locking.

Optionally, the status information of the log of locking includes an identification of the log of locking; monitoring whether all the read-only nodes have played back to the log of locking includes: receiving an identification of a log that has been played back sent by the read-only node and determining whether all the read-only nodes have played back to the log of locking by comparing the identification of the log that has been played back with the identification of the log of locking.

Optionally, the status record has been written with the status information of the log of locking corresponding to multiple operation requests; wherein the writing the status information of the log of locking into the status record includes: writing a status identification representing incomplete playback of the log of locking; after receiving, by the monitoring processing process, the identification of the log that has been played back sent by the read-only node, updating the status identification of incomplete playback of the log of locking to be a status identification of complete playback of the log of locking; or deleting the identification of the log of locking and the status identification of incomplete playback of the log of locking.

Optionally, after writing the status information of the log of locking into the status record, the method further includes: performing an unlocking operation to the data table.

Optionally, there are multiple operation requests, and each of the operation requests corresponds to a log of locking, and the monitoring processing process is configured for monitoring whether the log of locking for each operation request has played back by all the read-only nodes.

Optionally, there are multiple operation requests, and the method further includes: creating an operation processing process for each operation request wherein each operation processing process is performing the operation request on the data table initiated by the requester; after performing the locking operation to the data table, returning the request processing completion message to the requester; writing the log of locking the data table into the redo log file; and terminating the process.

Optionally, the status record is a permanent storage file.

Optionally, the operation request includes: an operation request of a Data Definition Language (DDL) transaction.

Optionally, the operation request includes: an operation request for deleting database table structure object; wherein the performing the corresponding operation on the data table based on the operation request includes: deleting the database table structure object based on the operation request.

According to a second aspect of the embodiments of the present description, an operation request processing apparatus is provided, wherein the apparatus is applied to a read-write node in a shared storage service cluster, and the service cluster includes at least one read-write node and at least one read-only node; wherein the apparatus includes: a request processing module which is configured for: performing a locking operation, for an operation request to a data table initiated by a requester, to the data table, and writing a log of locking the data table into a redo log file, and after writing status information of the log of locking into a status record, returning a request processing completion message to the requester; and a monitoring processing module which is configured for: after monitoring, based on the status information of the log of locking in the status record, that all read-only nodes have played back to the log of locking in the redo log file, performing a corresponding operation on the data table based on the operation request.

Optionally, the monitoring processing module monitors, according to a set period, whether all the read-only nodes have played back to the log of locking.

Optionally, the status information of the log of locking comprises an identification of the log of locking; the monitoring processing module is also configured for: receiving an identification of a log that has been played back sent by the read-only node and determining whether all the read-only nodes have played back to the log of locking by comparing the identification of the log that has been played back with the identification of the log of locking.

Optionally, the status record has been written with the status information of the log of locking corresponding to multiple operation requests; when the request processing module writes status information of the log of locking into a status record, it is specifically configured for: writing a status identification representing incomplete playback of the log of locking; the monitoring processing module is also configured for: after receiving, by the monitoring processing process, the identification of the log that has been played back sent by the read-only node, updating the status identification of incomplete playback of the log of locking to be a status identification of complete playback of the log of locking; or deleting the identification of the log of locking and the status identification of incomplete playback of the log of locking.

Optionally, the request processing module is also configured for: after writing the status information of the log of locking into the status record, performing an unlocking operation to the data table.

Optionally, there are multiple operation requests, and each of the operation requests corresponds to a log of locking, and the monitoring processing module is configured for monitoring whether the log of locking for each operation request has played back by all the read-only nodes.

Optionally, there are multiple operation requests, and request processing module is also configured for: creating an operation processing process for each operation request wherein each operation processing process is performing the operation request on the data table initiated by the requester; after performing the locking operation to the data table, returning the request processing completion message to the requester; writing the log of locking the data table into the redo log file; and terminating the process.

Optionally, the status record is a permanent storage file.

Optionally, the operation request includes: an operation request of a Data Definition Language (DDL) transaction.

Optionally, the operation request includes: an operation request for deleting database table structure object; the monitoring processing module is also configured for: deleting the database table structure object based on the operation request.

According to a third aspect of the embodiments of the present description, a computer device is provided, wherein the computer device is a read-write node in a shared storage service cluster, and the shared storage service cluster includes at least one read-write node and at least one read-only node; wherein the computer device includes a memory, a processor, and a computer program stored in the memory and executable on the processor, and wherein the processor implements embodiments of the foregoing operation request processing method when executing the program.

According to a fourth aspect of the embodiments of the present description, a computer-readable storage medium is provided, wherein the computer-readable storage medium stores computer programs, and the computer programs implement embodiments of the foregoing operation request processing method when executed by a processor.

According to a fifth aspect of the embodiments of the present description, a database system is provided, including: at least one read-write node, at least one read-only node and a shared storage node; wherein the shared storage node is configured for storing data, status file and log file; the read-only node is configured for playing back a log; the read-write node is configured for: performing a locking operation, for an operation request to a data table initiated by a requester, to the data table, and writing a log of locking the data table into a redo log file, and after writing status information of the log of locking into a status record; returning a request processing completion message to the requester; and after monitoring, by a monitoring processing process based on the status information of the log of locking in the status record, that all read-only nodes have played back to the log of locking, performing a corresponding operation on the data table based on the operation request.

The technical solutions provided by the embodiments of the present description may include the following beneficial effects.

In the embodiments of the present description, after a read-write node obtains an operation request to a data table, it does not need to wait for all read-only nodes, and return a request processing completion message to the requester in time; the data table is locked, a log of locking the data table is written into a redo log file, and after writing status information of the log of locking into a status record, a monitoring processing process may use the status record and the log of locking to implement log playback monitoring for all read-only nodes, which realize the asynchronous processing mechanism, and improve the stability and efficiency of performing an operation request.

It should be understood that the previous general description and the following detailed description are merely examples and explanations, and impose no limitation on the present description.

BRIEF DESCRIPTION OF THE DRAWINGS

The accompanying drawings are incorporated in and constitute a part of the present description, and illustrate embodiments consistent with the present description and explain the principles of the present description together with the description.

FIG. 1 is a schematic diagram illustrating a database system according to an exemplary embodiment of the present description;

FIG. 2A is a flow chart illustrating an operation request processing method according to an exemplary embodiment of the present description;

DETAILED DESCRIPTION

Figure 2B:
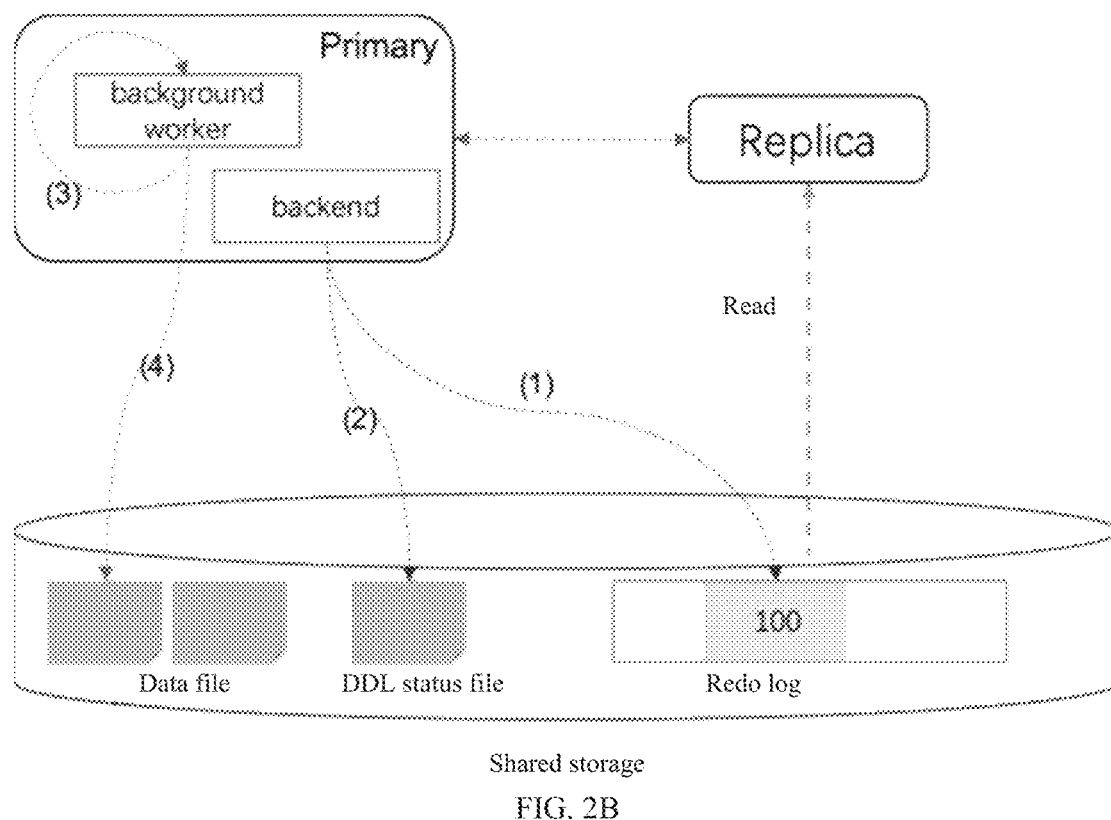
FIG. 2B is a schematic diagram illustrating an application scenario of an operation request processing method according to an exemplary embodiment of the present description.

Reference will now be made in detail to exemplary embodiments, examples of which are illustrated in the accompanying drawings. When the following, description relates to the accompanying drawings, unless specified otherwise, the same numbers in different accompanying drawings represent same or similar elements. The implementations set forth in the following description of exemplary embodiments do not represent all implementations consistent with the present description. Instead, they are merely examples of apparatuses and methods that are described in the appended claims in detail and consistent with some aspects of the present description.

The terms used in the present description are merely for the purpose of describing specific embodiments, and are not intended to limit the present description. The terms "a" and "the" of singular forms used in the present description and the appended claims are also intended to include plural forms, unless otherwise specified in the context clearly. It should be further understood that the term "and/or" used in the present description indicates and includes any or all possible combinations of one or more associated listed items.

It should be understood that although the terms "first", "second", "third", etc. may be used in the present description to describe various types of information, the information is not limited to the terms. These terms are merely used to differentiate between information of the same type. For example, without departing from the scope of the present description, first information may also be referred as second information, and similarly, second information may also be referred as first information. Depending on the context, the word "if" as used here may be explained as "while", "when", or "in response to determining".

As shown in FIG. 1, it is a schematic diagram illustrating a database system based on a shared storage architecture according to an exemplary embodiment the present description. FIG. 1 illustrates a read-write compute node (hereinafter referred to as read-write node, Primary) and two read-only compute nodes (hereinafter referred to as read-only node, Replica). The number of read-write nodes and read-only nodes in FIG. 1 are just for illustration, and the present description does not limit the number of read-write nodes and read-only nodes.

The database system of this embodiment further includes a shared storage node. The shared storage architecture may realize separation of storage and computing, and each computing node shares the same storage data, that is, S1, S2 to Sn files shown in FIG. 1. The S1, S2 to Sn files are stored by the shared storage node and FIG. 1 takes one shared storage node for illustration. The present description does not limit the number of read-write nodes and read-only nodes.

In this embodiment, the Primary node is a primary node, which externally provides read and write services. The Replica node may be a disaster recovery node for the Primary and may also be a node that externally provides read-only services, and the Primary node and the Replica node share a copy of underlying data and logs. Under the shared storage architecture, some data table operations executed by the Primary need to refer to the behavior of the Replica. For example, the Primary may receive a DDL (Data Definition Language) transaction, and the DDL transaction is an operation related to the table structure itself, such as adding or deleting data column, creating table, or deleting table, etc. The operation of the Primary executing the DDL transaction need to refer to the behavior of the Replica, that is, when the Primary executes the DDL operation, it needs to wait for all the Replicas to complete their existing operations. Specifically, all operations executed by the Primary on the data table may be recorded in a Redo log file and the Replica may keep the data in the memory consistent with the data of the Primary by playing back each log in the Redo log file. Playing back means that the Replica reads the log in the Redo log file and executes the operations corresponding to the operations performed by the Primary.

As an example, before the Primary needs to operate on a data table, the Primary needs to determine that the Replicas have completed all other operations before the operation on the data table. Assuming that currently, the Primary needs to add columns to data table A, and before the current column addition operation, data table A also involves column deletion operation of other columns. At this time, the previous column deletion operation has not been completed during the process of log playback of the Replicas. Then the Primary may not perform the current column addition operation until the Replicas complete the previous column deletion operations, thereby preventing data errors.

Take the operation of deleting a table as an example, if the Primary read-write node currently needs to delete a data table, which is to delete the corresponding file from a perspective of storage. At this time, there may still be transactions that need to be accessed by the read-only nodes and thus the Primary may not perform the current deletion operation until the Replicas complete the access operation, in order to prevent errors when the read-only nodes access the transaction storage.

It can be seen that if a synchronization solution is adopted to synchronously wait for all Replicas, the operation processing efficiency of the Primary may be affected by the delay between primary and backup. For example, if there are a large number of Replicas and some Replicas have relatively longer delays, then the waiting time for synchronization is uncertain, the execution performance of the user's operation request is unstable, and the processing efficiency is low, which may have a great impact on the user.

Based on this, the embodiments of the present description provide an operation request processing method. After the read-write node obtains an operation request for a data table, it may return a request processing completion message to a requester in time without waiting for all read-only nodes. By locking the data table, writing a log of locking the data table into a redo log file, and monitoring the playback of logs for all read-only nodes based on the log of locking, the asynchronous processing mechanism is realized which improves the stability and efficiency of operation request execution.

As shown in FIG. 2, it illustrates a flow chart illustrating an operation request processing method according to an exemplary embodiment of the present description. The method is applied to a read-write node in a shared storage service cluster. The service cluster includes at least one read-write node and at least one read-only node. The read-write node and the read-only node share the same storage data, and the method of this embodiment may include the following steps 202-204.

At step 202, performing a locking operation, for an operation request to a data table initiated by a requester, to the data table, and writing a log of locking the data table into a redo log file, and after writing status information of the log of locking into a status record, returning a request processing completion message to the requester.

At step 204, after monitoring, by a monitoring processing process based on the status information of the log of locking in the status record, that all read-only nodes have played back to the log of locking, performing a corresponding operation on the data table based on the operation request.

It can be seen from the foregoing embodiments that in order to improve processing efficiency, the embodiments of the present description provide an asynchronous processing solution. In the application scenarios of the embodiments of the present description, asynchronous processing is implemented through monitoring processing progress and status record. Specifically, the Primary node may receive an operation request for a data table initiated by a requester, and in response to the operation request, after locking the data table, the Primary node writes a log of locking the data table into a redo log file, and after writing status information of the log of locking into a status record, returns a request processing completion message to the requester. It can be seen that the Primary returns the processing completion message to the user quickly without waiting for the log playback of all Replicas. The Primary no longer synchronously waits for the playback status of all Replicas, thereby significantly improving the processing efficiency.

Further, because the data table to be operated is locked, the data table may be kept in a locked status, and other operation requests to the data table are blocked through the lock mechanism to prevent processing conflicts caused by other current operation requests. On the other hand, there are more effects for executing the locking operation. After performing the locking operation, the log of locking the data table needs to be written into a redo log file, the status information of the log of locking is written into the status record, and the monitoring processing process monitors the log playback status of the read-only nodes through the status record. Specifically, the read-only node needs to read each log in the redo log file to operate on the data in the memory, to ensure that the data in the memory is consistent with the memory data of the read-write node. Each log in the redo log is written based on a chronological order of the operations, and the monitoring processing process in this embodiment runs continuously in the backend. The log playback status of all read-only nodes is monitored through the status information of the log of locking recorded in the status record to determine whether all read-only nodes have processed to the current operation, so as to determine whether the corresponding operation may be performed on the data table. The corresponding operation may be performed on the data table based on the operation request on the data table only on condition that all read-only nodes have processed to the current operation. The log of locking is written with specific operation information of this operation request, such as the time of the operation request, which data table to operate, how to operate, etc. Therefore, after it is determined that all read-only nodes play back to the log of locking, the corresponding operation required by the operation request is performed asynchronously according to the record of the log of locking in the redo log.

It can be seen from the foregoing embodiments that after the read-write node obtains the operation request for the data table, the read-write node may return a request processing completion message to the requester in time without waiting for all read-only nodes. By locking the data table, after the log of locking the data table is written into the redo log file and the status information of the log of locking is written into the status record, the monitoring processing process may monitor the log playback of the read-only nodes by using the status record and the log of locking, thereby realizing the asynchronous processing mechanism.

In the embodiments of the present description, due to the hysteresis of log playback, it takes a certain amount of time for read-only nodes from Obtaining operation requests to completing corresponding operations. The monitoring process may periodically check whether all read-only nodes play back to the log of locking according to a set period. Step 202 may be performed by another process which is referred to as an operation processing process in this embodiment. After the operation processing process completes step 202, the process is terminated, and the read-write node does not need to wait for the log playback process of the read-only node. The Primary may receive a large number of operation requests. Because a corresponding operation may be performed after each operation request, based on this, in this embodiment an operation processing process is created for each operation request, and each operation processing process performs the operation corresponding to the operation request. After locking the data table, the log of locking the data table is written into the redo log file, and after the status information of the log of locking is written into the status record, the request processing completion message is returned to the requester, and the process is terminated.

Then, the monitoring processing process monitors whether all read-only nodes play back to the log of locking. The monitoring processing process may periodically check the identification of the log of locking that has not been played back in the status record, and the monitoring processing process may also receive the identification of a log that has been played back sent by the read-only node, and monitor whether all read-only nodes play back to the log of locking by comparing the identification of the log that has been played back with the identification of the log of locking. In the embodiments of the present description, there may be a large number of log files, but the log writing process is generally appended to the currently latest log file in sequence. There are many logs in each log file, and each log has a unique identification number, and the log identification in the log file is incremented. On the other hand, after the Primary generates a log, it may notify the log sending process (or the process periodically checks whether there is a newly generated log), to send the log to the Replica. After the Replica receives the log, it may respond a message to the Primary and inform, in the respond message, the current playback location of the Replica, that is, the Replica responds to the Primary with the identification of the log which has been played back currently. Based on this, the monitoring processing process may receive the identification of the log that has been played back sent by the read-only node and determine whether all read-only nodes play back to the log of locking by comparing the identification of the log that has been played back with the identification of the log of locking.

Because there may be many operation requests, the status record is written with identifications of multiple logs of locking; when the identification of the log of locking is written into the status record, the status identification of incomplete playback of the log of locking is also written. Based on this, the monitoring processing process can periodically check which logs of locking have not been played back, and when the identification of a log that has been played back sent by the read-only nodes is received, the identification of a log of locking that has not been played back may be read through the status identification, so that the identification of the log of locking that has not been played back may be compared with the received identification of the log that has been played back. There may be only one monitoring processing process in this embodiment, and the monitoring processing process may monitor, through the status record, the logs of locking of all operation requests. The status record is a permanent storage file, that is, the status record file is stored in a storage device (such as a disk)

that may be stored permanently. Thus, the problem of data loss, which may occur under abnormal conditions such as node device restart, may be solved.

Further, after the identification of the log that has been played back sent by the read-only node is received, the corresponding status identification may be removed in the status record; optionally, the status identification of incomplete playback of the log of locking may be updated to be the status identification of complete playback of the log of locking that has been played back; or, the identification of the log of locking and the status identification of incomplete playback of the log of locking may also be deleted.

It can be seen from the foregoing description that in the present embodiment, in response to the operation request, the data table will be locked, and after the log of locking and status record are written, an unlocking operation will be performed. Subsequently, after the monitoring processing process monitors that all read-only nodes have played back to the log of locking, corresponding operations may be performed by reading the log of locking, and there are different processing methods for different types of operation requests. Optionally, in some examples, the operation request includes: an operation request for deleting the database table structure object. The corresponding operation on the data table performed based on the operation request includes: deleting the database table structure object based on the operation request. In this embodiment, because it is a delete operation, the processing may be terminated directly after the database table structure object is deleted based on the operation request.

Next, the solution of the embodiments of the present description will be described again with reference to FIG. 2B. In this embodiment, taking a Primary node receiving an operation request about deleting the data table DROP TABLE as an example for description, and the process is as follows:

(1) The Primary node is configured with an operation processing process (backend in the FIG. 2B), which is used to receive a DDL statement request initiated by a requester; after receiving the DDL statement, the Primary node writes a REDO log to acquire the table lock, and it is assumed that the log number is 100.

(2) When the transaction is committed, the log number and status of the current DDL operation is written into a DDL status file, and the status 0 is used to indicate that it is not completed, that is, [100, 0]; then the unlocking operation is performed, and then the DDL operation is completed. The data in the file system will not be deleted and the playback status of the Replica will not be waited synchronously.

(3) The monitoring processing process (background worker in the FIG. 2) reads the DDL status file and judges the status of the REDO log in it. If there is a log with a status 0, then whether all Replicas have played back to this log is determined. Take the above figure as an example, that is, whether all Replicas have played back to log 100 is determined.

(4) If all Replicas have played back to the REDO log, then the REDO log is read and parsed, and the file operations corresponding to the log are performed, such as deleting the file corresponding to the REDO log, and the status of the REDO log in the DDL status file is set to 1.

In this embodiment, after the operation processing process (backend) receives the DDL request, it locks the data table, then writes the log of locking and the DDL status information into the status record file. The format of the status information in this embodiment may be [lsn, status], wherein lsn is the log identification, and status is the status of the log. After the writing is completed, the lock may be released, and a request processing completion message is returned. At this point, the DDL execution is terminated. In this embodiment, through writing DDL status information into a permanent status record file, there is no need to wait for all Replicas to play back to the log of locking.

In this embodiment, the background worker periodically checks the DDL status file, to detect whether the Replica has played back to the corresponding DDL lsn. If it has played back to the corresponding DDL lsn, then the background worker reads, according to the lsn of the DDL, log of locking recorded in the DDL status file, the log content from the redo log, and parses DDL information from it, and performs related file operations (taking the Drop table operation in the present embodiment as an example, the corresponding processing operation is to delete the corresponding file).

It can be seen from the above embodiments that during the asynchronous DDL process, the operation processing process no longer waits for all Replicas synchronously, but only needs to write the DDL REDO log and its status into the DDL status file. The monitoring processing process may periodically and asynchronously determine whether the REDO logs recorded in the DDL status file have been played back by all Replicas. If the REDO logs have been played back, then the REDO logs are parsed and related file operations are performed. The asynchronous process is not perceived by the user.

Corresponding to the foregoing embodiments of operation request processing method, the present description also provides embodiments of an operation request processing apparatus and a computer device to which the operation request processing apparatus applies.

Figure 3:
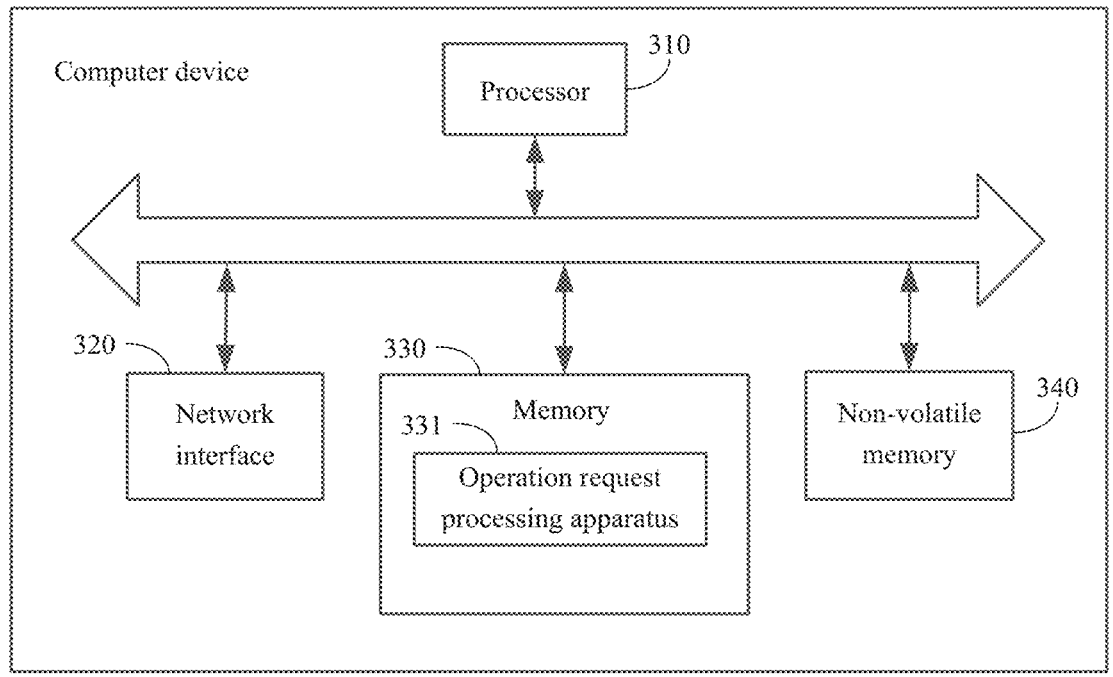
FIG. 3 is a hardware structural diagram illustrating a computer device where the operation request processing apparatus in the present description is located.

The embodiments of the operation request processing apparatus in the present description may be applied to a computer device, for example, a server or a terminal device. The embodiments of the apparatus may be implemented by software, hardware, or a combination of hardware and software. Taking a software embodiment as an example, as a logical apparatus, the apparatus is formed by a processor, in a file processing system, reading a corresponding computer program instruction from a non-volatile memory to a memory and executing the program instruction. In terms of hardware, FIG. 3 illustrates a hardware structural diagram illustrating a computer device where the operation request processing apparatus in the present description is located. In addition to a processor 310, a memory 330, a network interface 320, and a non-volatile memory 340 shown in FIG. 3, the server or electronic device where the operation request processing apparatus 331 in the embodiments is located may usually include other hardware based on actual functions of the computer device. Detailed description of the hardware is omitted here for simplicity.

Figure 4:
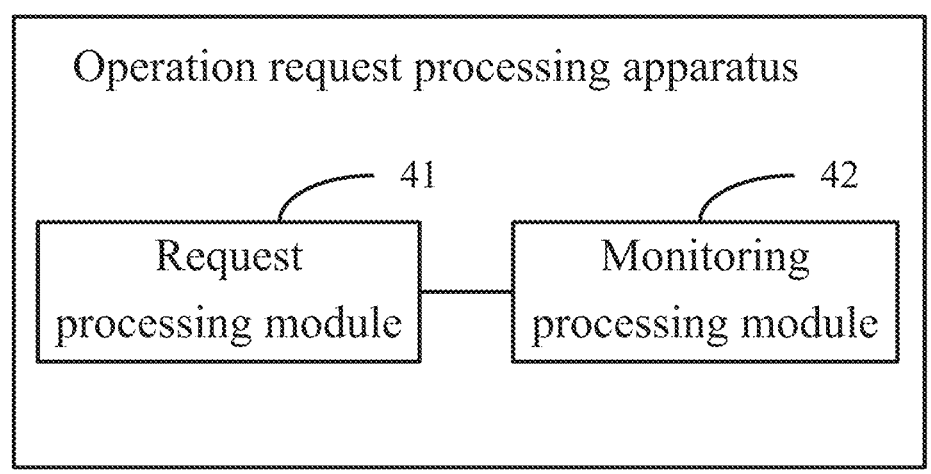
FIG. 4 is a block diagram illustrating an operation request processing apparatus according to an exemplary embodiment of the present description.

As shown in FIG. 4, FIG. 4 is a block diagram illustrating an operation request processing apparatus according to an exemplary embodiment of the present description. The apparatus is applied to a read-write node in a shared storage service cluster, and the service cluster includes at least one read-write node and at least one read-only node. The apparatus includes a request processing module 41 and a monitoring processing module 42.

The request processing module 41 is configured for: performing a locking operation, for an operation request to a data table initiated by a requester, to the data table, and writing a log of locking the data table into a redo log file, and after writing status information of the log of locking into a status record, returning a request processing completion message to the requester.

The monitoring processing module 42 is configured for: after monitoring, based on the status information of the log of locking in the status record, that all read-only nodes have played back to the log of locking in the redo log file, performing a corresponding operation on the data table based on the operation request.

Optionally, the monitoring processing module monitors, according to a set period, whether all the read-only nodes have played back to the log of locking.

Optionally, the status information of the log of locking comprises an identification of the log of locking; the monitoring processing module is also configured for: receiving an identification of a log that has been played back sent by the read-only node and determining whether all the read-only nodes have played back to the log of locking by comparing the identification of the log that has been played back with the identification of the log of locking.

Optionally, the status record has been written with the status information of the log of locking corresponding to multiple operation requests; the request processing method is configured for: writing a status identification representing incomplete playback of the log of locking.

The monitoring processing module is also configured for: after receiving, by the monitoring processing process, the identification of the log that has been played back sent by the read-only node, updating the status identification of incomplete playback of the log of locking to be a status identification of complete playback of the log of locking; or deleting the identification of the log of locking and the status identification of incomplete playback of the log of locking.

Optionally, the request processing module is also configured for: after writing the status information of the log of locking into the status record, performing an unlocking operation to the data table.

Optionally, there are multiple operation requests, and each of the operation requests corresponds to a log of locking, and the monitoring processing module is configured for monitoring whether the log of locking for each operation request has played back by all the read-only nodes.

Optionally, there are multiple operation requests, and request processing module is also configured for: creating an operation processing process for each operation request wherein each operation processing process is performing the operation request on the data table initiated by the requester; after performing the locking operation to the data table, returning the request processing completion message to the requester; writing the log of locking the data table into the redo log file; and terminating the process.

Optionally, the status record is a permanent storage file.

Optionally, the operation request includes: an operation request of a Data Definition Language (DDL) transaction.

Optionally, the operation request includes: an operation request for deleting database table structure object; the monitoring processing module is also configured for: deleting the database table structure object based on the operation request.

For an embodiment process of functions and roles of each module in the operation request processing apparatus, references can be made to an embodiment process of a corresponding step in the previously operation request processing method. Details are omitted here for simplicity.

Correspondingly, an embodiment of the present description further provides a computer device, wherein the computer device is a read-write node in a shared storage service cluster, and the shared storage service cluster includes the at least one read-write node and at least one read-only node; wherein the computer device includes a memory, a processor, and a computer program stored in the memory and executable on the processor, wherein the processor implements embodiments of the foregoing operation request processing method when executing the program.

Correspondingly, an embodiment of the present description further provides a database system, including: at least one read-write node, at least one read-only node and a shared storage node; wherein the shared storage node is configured for storing data, status file and log file; the read-only node is configured for playing back a log; the read-write node is configured for: performing a locking operation, for an operation request to a data table initiated by a requester, to the data table, and writing a log of locking the data table into a redo log file, and after writing status information of the log of locking into a status record, returning a request processing completion message to the requester; and after monitoring, by a monitoring processing process based on the status information of the log of locking in the status record, that all read-only nodes have played back to the log of locking, performing a corresponding operation on the data table based on the operation request.

Optionally, the monitoring processing process monitors, according to a set period, whether all the read-only nodes have played back to the log of locking.

Optionally, the status information of the log of locking comprises an identification of the log of locking; monitoring whether all the read-only nodes have played back to the log of locking includes: receiving an identification of a log that has been played back sent by the read-only node and determining whether all the read-only nodes have played back to the log of locking by comparing the identification of the log that has been played back with the identification of the log of locking.

Optionally, the status record has been written with the status information of the log of locking corresponding to multiple operation requests; wherein the writing the status information of the log of locking into the status record includes: writing a status identification representing incomplete playback of the log of locking; after receiving, by the monitoring processing process, the identification of the log that has been played back sent by the read-only node, updating the status identification of incomplete playback of the log of locking to be a status identification of complete playback of the log of locking; or deleting the identification of the log of locking and the status identification of incomplete playback of the log of locking.

Optionally, after writing the status information of the log of locking into the status record, the method further includes: performing an unlocking operation to the data table.

Optionally, there are multiple operation requests, and each of the operation requests corresponds to a log of locking, and the monitoring processing process is configured for monitoring whether the log of locking for each operation request has played back by all the read-only nodes.

Optionally, there are multiple operation requests, and the method further includes: creating an operation processing process for each operation request wherein each operation processing process is performing the operation request on the data table initiated by the requester; after performing the locking operation to the data table, returning the request processing completion message to the requester; writing the log of locking the data table into the redo log file; and terminating the process.

Optionally, the status record is a permanent storage file.

Optionally, the operation request includes: an operation request of a Data Definition Language (DDL) transaction.

Optionally, the operation request includes: an operation request for deleting database table structure object; wherein the performing the corresponding operation on the data table based on the operation request comprises: deleting the database table structure object based on the operation request.

Because apparatus embodiments basically correspond to method embodiments, for related parts, references can be made to related descriptions in the method embodiments. The previously described apparatus embodiments are merely examples. The modules described as separate parts can be or does not have to be physically separate, and parts displayed as modules can be or does not have to be physical modules, and can be located in one position, or can be distributed on multiple network modules. Some or all of the modules can be selected based on actual needs to achieve the objectives of the solutions of the present description. A person of ordinary skill in the art can understand and implement the embodiments of the present description without creative efforts.

Specific embodiments of the present description are described above. Other embodiments fall within the scope of the appended claims. In some situations, the actions or steps recorded in the claims can be performed in a sequence different from that in the embodiments and a desired result can still be achieved. In addition, the process depicted in the accompanying drawings does not necessarily need a specific sequence or a consecutive sequence to achieve the desired result. In some implementations, multitasking and parallel processing may be feasible or may be advantageous.

A person skilled in the art can easily figure out another embodiment of the present description after thinking over the present description and practicing the present description disclosed here. The present disclosure is intended to cover any variations, uses, or adaptations of the present disclosure, and these variations, uses, or adaptations follow the general principles of the present disclosure and include common knowledge or conventional techniques that are not disclosed in the technical field of the present disclosure. The present description and the embodiments are merely considered as examples, and the actual scope and the spirit of the present disclosure are pointed out by the following claims.

It should be understood that the present description is not limited to the precise structures that have been described above and shown in the drawings, and various modifications and changes can be made without departing from the scope of the present disclosure. The scope of the present disclosure is limited by the appended claims only.

The previous descriptions are merely preferred embodiments of the present description, but are not intended to limit the present description. Any modification, equivalent replacement, or improvement made without departing from the spirit and principle of the present disclosure shall fall within the protection scope of the present description.

What is claimed is:

1. An operation request processing method, applied to a read-write node in a shared storage service cluster comprising at least one read-write node and at least one read-only node, the method comprising:
performing a locking operation, for an operation request to a data table initiated by a requester, to the data table, and writing a log of locking the data table into a redo log file, and after writing status information of the log of locking into a status record, returning a request processing completion message to the requester, wherein the status information of the log of locking comprises an identification of the log of locking; and
after monitoring, by a monitoring processing process based on the status information of the log of locking in the status record, that all read-only nodes have played back to the log of locking, performing a corresponding operation on the data table based on the operation request, wherein monitoring whether all the read-only nodes have played back to the log of locking comprises:
receiving an identification of a log that has been played back sent by the read-only node and determining whether all the read-only nodes have played back to the log of locking by comparing the identification of the log that has been played back with the identification of the log of locking.

2. The method according to claim 1, wherein the monitoring processing process monitors, according to a set period, whether all the read-only nodes have played back to the log of locking.

3. The method according to claim 2, wherein there are a plurality of operation requests, and each of the operation requests corresponds to a log of locking, and the monitoring processing process is configured for monitoring whether the log of locking for each operation request has played back by all the read-only nodes.

4. The method according to claim 1, wherein the status record has been written with the status information of the log of locking corresponding to a plurality of operation requests; wherein the writing the status information of the log of locking into the status record comprises:
writing a status identification representing incomplete playback of the log of locking;
after receiving, by the monitoring processing process, the identification of the log that has been played back sent by the read-only node, updating the status identification of incomplete playback of the log of locking to be a status identification of complete playback of the log of locking; or
deleting the identification of the log of locking and the status identification of incomplete playback of the log of locking.

5. The method according to claim 1, wherein after writing the status information of the log of locking into the status record, the method further comprises: performing an unlocking operation to the data table.

6. The method according to claim 1, wherein there are a plurality of operation requests, and the method further comprises: creating an operation processing process for each operation request wherein each operation processing process is performing the operation request on the data table initiated by the requester; after performing the locking operation to the data table, returning the request processing completion message to the requester; writing the log of locking the data table into the redo log file; and terminating the process.

7. The method according to claim 1, wherein the status record is a permanent storage file.

8. The method according to claim 1, wherein the operation request comprises: an operation request of a Data Definition Language (DDL) transaction.

9. The method according to claim 1, wherein the operation request comprises: an operation request for deleting database table structure object; wherein the performing the corresponding operation on the data table based on the operation request comprises: deleting the database table structure object based on the operation request.

10. A computer device, wherein the computer device is a read-write node in a shared storage service cluster comprising at least one read-write node and at least one read-only node; wherein the computer device comprises a memory, a processor, and a computer program stored in the memory and executable on the processor, and the processor implements the method according to claim 1 when executing the program.

11. A non-transitory computer-readable storage medium, wherein the computer-readable storage medium stores computer programs, and the computer programs implement the method according to claim 1 when executed by a processor.

12. An operation request processing apparatus, applied to a read-write node in a shared storage service cluster comprising at least one read-write node and at least one read-only node, the apparatus comprising:

at least one processor; and
 a memory communicatively connected with the at least one processor,
 wherein the memory stores instructions executable by the at least one processor, and the instructions, when executed by the at least one processor, cause the at least one processor to perform operations of:
 performing a locking operation, for an operation request to a data table initiated by a requester, to the data table, and writing a log of locking the data table into a redo log file, and after writing status information of the log of locking into a status record, returning a request processing completion message to the requester, wherein the status information of the log of locking comprises an identification of the log of locking; and
 after monitoring, based on the status information of the log of locking in the status record, that all read-only nodes have played back to the log of locking in the redo log file, performing a corresponding operation on the data table based on the operation request, wherein monitoring whether all the read-only nodes have played back to the log of locking comprises:
  receiving an identification of a log that has been played back sent by the read-only node and determining whether all the read-only nodes have played back to the log of locking by comparing the identification of the log that has been played back with the identification of the log of locking.

13. The operation request processing apparatus according to claim 12, wherein the at least one processor is further configured to monitor, according to a set period, whether all the read-only nodes have played back to the log of locking.

14. The operation request processing apparatus according to claim 13, wherein there are a plurality of operation requests, and each of the operation requests corresponds to a log of locking, and the at least one processor is configured to monitor whether the log of locking for each operation request has played back by all the read-only nodes.

15. The operation request processing apparatus according to claim 12, wherein after writing the status information of the log of locking into the status record, the at least one processor is further configured to perform an unlocking operation to the data table.

16. The operation request processing apparatus according to claim 12, wherein there are a plurality of operation requests, and the at least one processor is further configured to perform operations of: creating an operation processing process for each operation request wherein each operation processing process is performing the operation request on the data table initiated by the requester; after performing the locking operation to the data table, returning the request processing completion message to the requester; writing the log of locking the data table into the redo log file; and terminating the process.

17. A database system, comprising at least one read-write node, at least one read-only node and a shared storage node, wherein the shared storage node is configured for storing data, status file and log file;
 the read-only node is configured for playing back a log;
 the read-write node is configured for: performing a locking operation, for an operation request to a data table initiated by a requester, to the data table, and writing a log of locking the data table into a redo log file, and after writing status information of the log of locking into a status record, wherein the status information of the log of locking comprises an identification of the log of locking, returning a request processing completion message to the requester; and after monitoring, by a monitoring processing process based on the status information of the log of locking in the status record, that all read-only nodes have played back to the log of locking, performing a corresponding operation on the data table based on the operation request, wherein monitoring whether all the read-only nodes have played back to the log of locking comprises:
  receiving an identification of a log that has been played back sent by the read-only node and determining whether all the read-only nodes have played back to the log of locking by comparing the identification of the log that has been played back with the identification of the log of locking.

18. The operation request processing apparatus according to claim 17, wherein the status record has been written with the status information of the log of locking corresponding to a plurality of operation requests; wherein the writing the status information of the log of locking into the status record comprises:

writing a status identification representing incomplete playback of the log of locking;
 after receiving the identification of the log that has been played back sent by the read-only node, updating the status identification of incomplete playback of the log of locking to be a status identification of complete playback of the log of locking; or
 deleting the identification of the log of locking and the status identification of incomplete playback of the log of locking.

* * * * *